US012399683B2

(12) United States Patent
Wang

(10) Patent No.: US 12,399,683 B2
(45) Date of Patent: Aug. 26, 2025

(54) PROCESSING OF DATA ARRAYS AND APPLICATIONS INCLUDING IMAGE PROCESSING

(71) Applicant: Imaemi LLC, Concord, MA (US)

(72) Inventor: Feiling Wang, Concord, MA (US)

(73) Assignee: IMAEMI LLC, Concord, MA (US)

( * ) Notice: Subject to any disclaimer, the term of this patent is extended or adjusted under 35 U.S.C. 154(b) by 166 days.

(21) Appl. No.: 18/220,819

(22) Filed: Jul. 11, 2023

(65) Prior Publication Data

US 2024/0012614 A1 Jan. 11, 2024

Related U.S. Application Data

(60) Provisional application No. 63/368,101, filed on Jul. 11, 2022.

(51) Int. Cl.
*G06F 7/26* (2006.01)
*G06F 17/16* (2006.01)

(52) U.S. Cl.
CPC ................ *G06F 7/26* (2013.01); *G06F 17/16* (2013.01)

(58) Field of Classification Search
CPC .................................. G06F 7/26; G06F 17/16
See application file for complete search history.

(56) References Cited

U.S. PATENT DOCUMENTS 5,841,891 A * 11/1998 Windig ..................... G06T 5/10 324/312
9,054,870 B2 * 6/2015 Gassi ........................ H04L 9/06
10,402,164 B1 * 9/2019 Wanjari .............. G06F 16/2237
2015/0023416 A1 * 1/2015 Tanaka .................. H04N 19/50 375/240.08

* cited by examiner

*Primary Examiner* — Farley Abad
(74) *Attorney, Agent, or Firm* — Perkins Cole LLP

(57) ABSTRACT

The disclosed technology can be implemented to provide a method for processing data including representing original data in form of a number array with one or more row elements and one or more column elements based on the original data, re-arranging elements of the number array based on properties of corresponding elements in the number array and properties of other elements of the number array to form a re-arranged number array, modifying values of elements of the re-arranged number array by superposing a product of an amplitude variable A and values of a function F selecting from an ensemble of functions, and re-arranging the elements of re-arranged number array with the modified values of elements to generate a modified number array. The amplitude variable A is computed to optimize a cost function associated with the amplitude variable A, the respective function F, and elements of the number array.

20 Claims, 15 Drawing Sheets
(4 of 15 Drawing Sheet(s) Filed in Color)

210 Input photograph P has M by N pixels, each of which is a nested array of 3 color elements: R, G, and B.

260 Point spread function PSF, which is either a user input or estimated from P.

220 Associate each pixel of P with a pair of indices {g, h}, which is determined by the pixels's row and column numbers and its R, G, and B values.

230 Select a function F from an ensemble of functions.

240 For each pixel of P, obtain a value: V = F(g, h).

250 Compute for a uniform amplitude A which, being applied in the following step, reduces a cost function C that involves PSF.

270 Modify each pixel of P by superposing the product of A and V onto its current value.

280 Is an exit criterion satisfied?

NO — 295 Select another function F from the ensemble.

YES — 290 Terminate the loop and output optimized P (A)

Figure 3B:
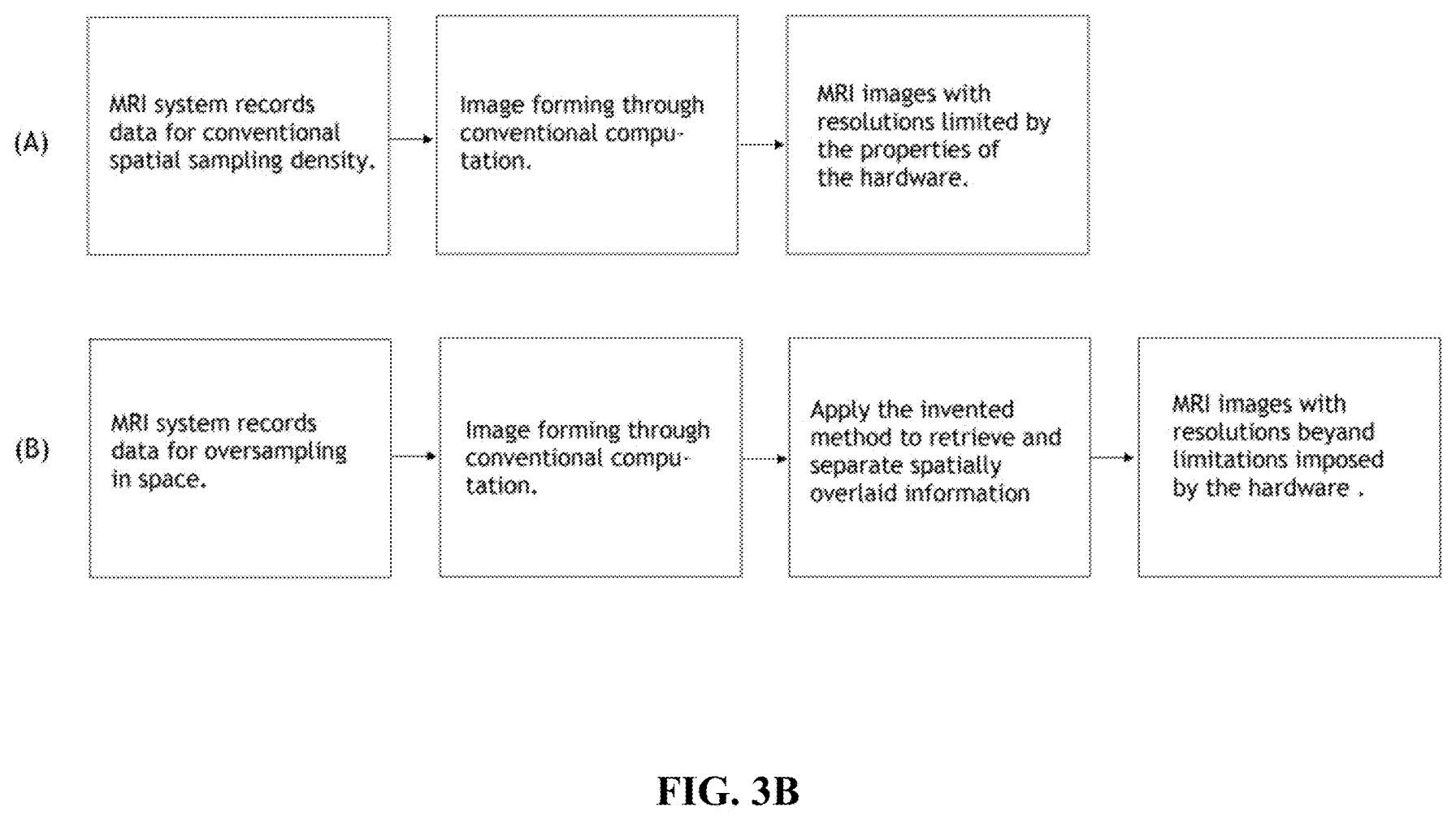

MRI system records data for conventional spatial sampling density.

→ Image forming through conventional computation.

→ MRI images with resolutions limited by the properties of the hardware.

(B)

MRI system records data for oversampling in space.

→ Image forming through conventional computation.

→ Apply the invented method to retrieve and separate spatially overlaid information → MRI images with resolutions beyond limitations imposed by the hardware .

Original image: Imaemi staff photographer
Image type: Color photograph

650

Original image: NASA, detail of Tarantula Nebula
Image type: Mid-IR image taken with James Webb Space Telescope

PROCESSING OF DATA ARRAYS AND APPLICATIONS INCLUDING IMAGE PROCESSING

PRIORITY CLAIMS AND RELATED PATENT APPLICATION

This patent document claims priority of U.S. Provisional Application No. 63/368,101 entitled "METHOD FOR OPTIMIZING NUMBER ARRAYS TO ACHIEVE A GOAL" and filed on Jul. 11, 2022, the entirety of which is incorporated by reference as part of the disclosure of this patent document.

TECHNICAL FIELD

This patent document relates to methods and systems for data processing of data arrays and various applications thereof including image processing methods and systems.

BACKGROUND

Various data may be organized as data arrays and such data arrays can processed to achieve certain information from the data. For example, data may contain undesired noise of the true information represented by the data and thus it may be desirable to process the data to reduce such noise to access the true information represented by the data. For another example, data may be organized in a data array for processing or to extract one or more features from the data.

In imaging applications, an image of an object may be represented by a 2-dimensional array of pixel signals indicating imaging information at different locations of the object. Such image data, however, may contain noise or may represent a blurred image. In some applications, it may be desirable to have data processing tools to reduce such noise to reduce the blurring of the image, or to improve the sharpness or resolution of the image.

SUMMARY

This patent document includes techniques and systems for processing data to extract certain feature from the data. In a wide range of applications, it may be desirable or necessary to reduce noise, to sharpen the image, or to improve the resolution of an image for imaging applications. As a specific example, the disclosed techniques can be implemented for providing image enhancing (e.g., sharpening) methods and systems that can convert a blurred image to an output image with an improved image quality (e.g., enhanced contrast and resolution) suitable for use, for example, in a wide range of imaging applications, including photograph, sensing, monitoring, medical and astronomical imaging applications.

In one aspect, the disclosed techniques can be implemented to provide a method for processing data. The method includes representing original data in form of a number array with one or more row elements and one or more column elements that are based on the original data; re-arranging elements of the number array based on properties of corresponding elements in the number array, respectively, and properties of other elements of the number array to form a re-arranged number array; modifying values of elements of the re-arranged number array by superposing a product of an amplitude variable A and values of a function F selecting from an ensemble of functions, wherein the value of the amplitude variable A is computed to optimize a cost function associated with the amplitude variable A, the respective function F, values of elements of the number array, and values of elements of re-arranged number array; and re-arranging the elements of re-arranged number array with the modified values of elements to generate a modified number array.

In another aspect, the disclosed techniques can be implemented to provide a method for processing data that includes representing original data in form of a number array with one or more row elements and one or more column elements that are based on the original data; associating elements of the number array with a set of indices arranged in an index array having row and column numbers matching row and column number of the number array, wherein values of the indices are dependent on properties of corresponding elements in the number array, respectively, and properties of other elements of the number array; modifying values of elements of the number array by superposing a product of an amplitude variable A and values of a function F selecting from an ensemble of functions that are generated by using values of the indices in the index array as input variables to the function F, wherein the value of the amplitude variable A is computed to optimize a cost function associated with the amplitude variable A, the respective function F, values of elements of the number array, and values of the indices of the index array; and generating a modified number array using the modified values of elements of the number array.

In another aspect, the disclosed techniques can be implemented to provide a method of improving an image quality of a first image generated by an imaging apparatus and represented by a first number array. This method includes designating an index to each of a plurality of pixels of the first number array based on one or more features of the pixel relative to other pixels of the first number array; adjusting an amplitude variable for each of one or more functions to optimize a cost function associated with the amplitude variable, the respective function, a plurality of pixel values, and a plurality of designated indexes; updating the plurality of pixel values based on the adjusted amplitude variable after each amplitude variable corresponding to the one or more functions is adjusted to optimize the cost function; and generating an output image represented by a second number array having a plurality of output image pixels formed by updated pixel values with an enhanced image quality.

In yet another aspect, the disclosed techniques can be implemented to provide a non-transitory computer readable storage medium comprising machine-readable instructions that upon execution by one or more processors, are configured to cause the one or more processors to perform a method comprising obtaining an original image from an imaging apparatus; processing pixels in the original image to generate a first image having a plurality of first pixels with more pixels than the original image; designating an index to each of a plurality of pixels of the first number array based on one or more features of the pixel relative to other pixels of the first number array; adjusting an amplitude variable for each of one or more functions to optimize a cost function associated with the amplitude variable, the respective function, a plurality of pixel values, and a plurality of designated indexes; updating the plurality of pixel values based on the adjusted amplitude variable after each amplitude variable corresponding to the one or more functions is adjusted to optimize the cost function; and generating an output image represented by a second number array having a plurality of output image pixels formed by updated pixel values with an enhanced image quality.

The above and other aspects of the disclosed data processing technology and their implementations are described in greater detail in the drawings, the description and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3B illustrates examples of applying the disclosed data processing in an MRI image system to achieve image resolutions beyond the limitation imposed by the MRI hardware: FIG. 3B (A) shows an example of a conventional MRI image forming process; FIG. 3B(B) is a signal processing flow that yields image resolutions beyond the conventional method based on the disclosed data processing.

FIG. 6B shows an example for using the present data processing technology to transform an original NASA image with some blurring into a higher quality image using the disclosed data processing to reduce the blurring and to improve the image resolution.

FIG. 9A shows an original, blurred image from the Webb telescope.

DETAILED DESCRIPTION

Figure 1:
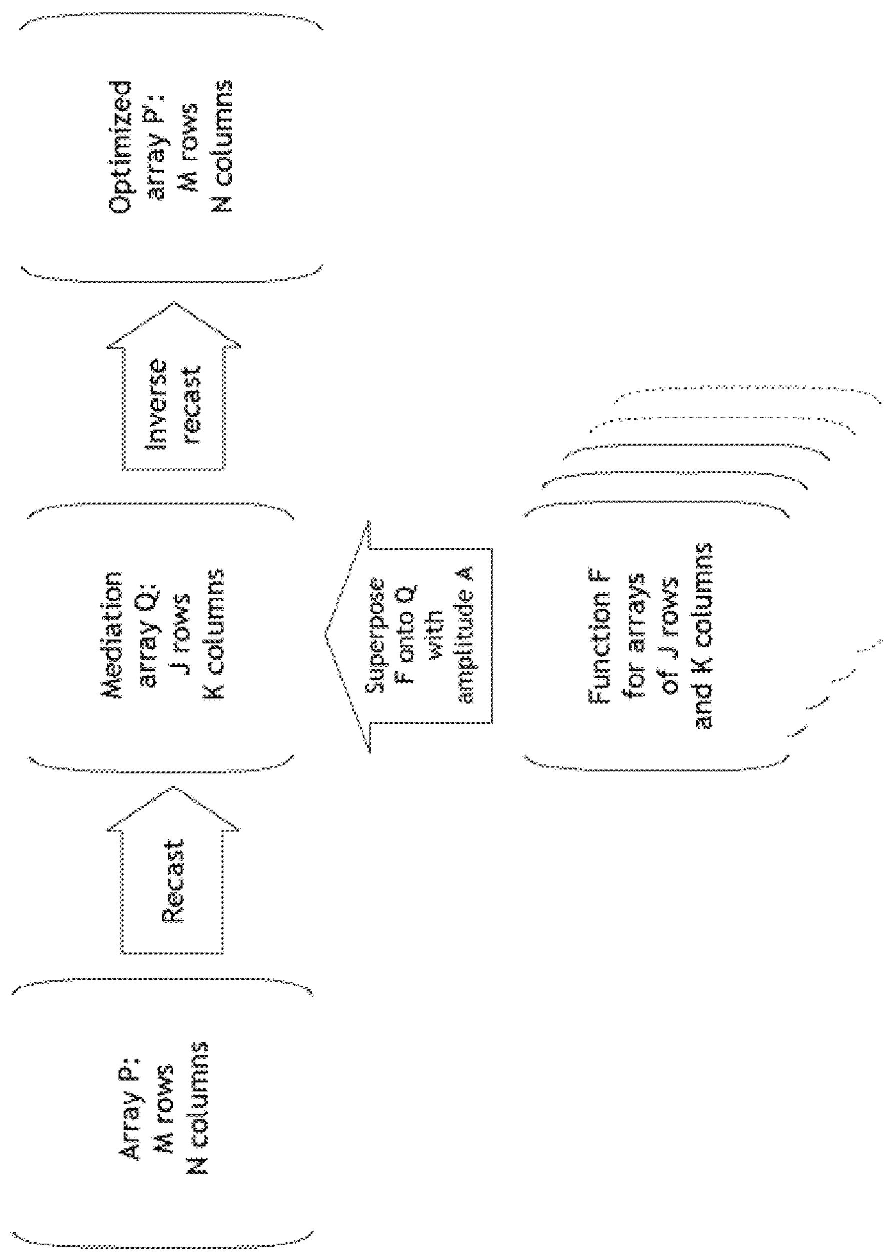
FIG. 1 shows an example of one embodiment of the disclosed data processing technology.

The data processing technology disclosed in this patent document can be used for processing data that is organized in a data array (e.g., an array of numbers) by way of an algorithm carried out in a digital computer or by using one or more digital processors to fulfill a desired goal. The data subject to the disclosed data processing technology can be a wide range of data, including data of an image or non-imaging data. An example of a number array is an array of image pixel data of a digital photograph; another example is an image produced by a magnetic resonance imaging (MRI) system; yet another example is an array of data collected from discrete receivers, such as light sensors or radio receivers, for forming images of celestial bodies or an anatomic subject.

A number array can contain information that arises from known and deterministic mechanisms and information that is random in nature, the latter is often referred to as noise. A difficulty in data processing is that mathematical operations intended for extracting, enhancing, distilling, deconvoluting, altering, or transforming information arising from a known origin (ground truth) may result in unwanted magnification of noise, which prevents the intended goal from being reached. Another difficulty in data processing is that the most favorable outcome may escape detection and, as a consequence, the result of signal processing is suboptimal. A further difficulty is that certain mathematical operations performed on a mathematical array leave traces of the operations in the resultant number array, causing emergence of undesirable artifacts.

The disclosed data processing technology can be used to provide, in various implementations, a method of processing number arrays with the ability of overcoming or alleviate the above-mentioned difficulties.

The disclosed data processing technology can be implemented as signal processing with a digital computer or with one or more digital processors to carry out a task of altering number arrays for a desirable outcome. An original number array, as recorded, can contain information arisen from a variety of sources and mechanisms. A common task of signal processing is to extract, from recorded number arrays, information about the original state of a particular signal source that contributes to the overall recorded number arrays.

By way of sensing and/or collecting signals into a number array, the information of interest in the signals may be distorted, overlaid, dispersed, intermixed, noised-over or otherwise degraded. One category of signal degradation is caused by known pathways and can be described by a mathematical transform of the original signal while another category arises from physical processes that are mathematically unpredictable. The latter kind is commonly referred to as noise. Because of the noise, methods for retrieving information of interest often involve stepwise optimization, as opposed to a direct mathematical inversion. The present invention aims at high-fidelity retrieval of information of interest from recorded number arrays in the presence of noise.

FIG. 1 shows an example of one embodiment of the disclosed data processing technology. Assume an original array P has M rows and N columns, each of the MN elements is in general a nested array of S elements. In the invented method, array P is first recast to become a mediation array Q having J rows and K columns, wherein the total number of elements JK may not be equal to MN. Like the original array, the elements of Q may be nested arrays. For the purpose of inverse recast to the original P format, the original row and column numbers of each element may be preserved in the recasted arrays of Q. Next, the values of the Q elements are modified by superposing the product of an amplitude A and a function F belonging to an ensemble of functions which distribute values to arrays of J rows and K columns. The schematic drawing in A goal of optimizing a number array can often be expressed in terms of minimizing a cost function. Those skilled in computation of number arrays should appreciate that for a given F there exist an A value that causes the superposition to yield a reduction or minimization of a chosen cost function. In the invented method, a computer algorithm can be constructed to successively execute the superposition, cycling through a chosen subgroup or the entire assembly of functions in the ensemble. There are benefits for consolidating certain groups of elements in the original array P into single elements in Q, one being that in applying the functions to Q those consolidated elements are altered together so that amplification of noise is suppressed. It is preferable that the consolidation result in a Q array whose dimensions, J and K, can be expressed by 2 to the powers of integer numbers, e.g., 2048, which is 2 to the power of 11. These dimensionalities facilitate the application of some mathematically orthonormal basis functions such as discrete Fourier series and Walsh function series.

In a computer algorithm, the recast of P can be implemented through an indexing scheme. Assume an array P has M rows and N columns, each of the MN elements is a nested array of S elements. In implementing the disclosed data processing, each of the elements of P is first assigned an additional set of indices T which is determined by the properties of this element and its relationship to other elements of P; next, for each element of P, use its T indices as variables for a function F to yield a value V=F(T); subsequently, the product of V and an amplitude A, which is uniform to all P elements, is superposed onto the present value of the P element. When F is selected from an appropriate function group and A is an appropriate value the superposition results in an altered P that is an optimization towards the objective set forth. In the invented method, a computer algorithm can be constructed to successively execute the superposition, cycling through a group of F functions.

Methods for creating indices T for P elements can vary widely depending on the properties of array P, the type of functions chosen, and the objective of the signal processing. In general, T for an element is a function of this and all other elements in array P. For instance, we can assign small-valued indices to red and reddish pixels in a photograph while assigning large-valued indices to blue and blueish pixels; if a function F has the property that it "turns small-T-valued pixels to pure red" and "turns large-T-valued pixels to pure blue" then the resultant P array will possess exaggerated red-blue color contrast, which may be an objective of the signal processing for highlighting such a contrast.

A function group employed for altering the elements of P (through the mediation of Q or indices T) can be composed of a number of known function types including trigonometry functions, discrete Fourier series, Zernike functions, Walsh function series, Hadamard series and so on. Sometimes a hybridization of various function types can be advantageous in efficient convergence towards a desired goal. A chosen function group may or may not be mathematically orthonormal.

Figure 2:
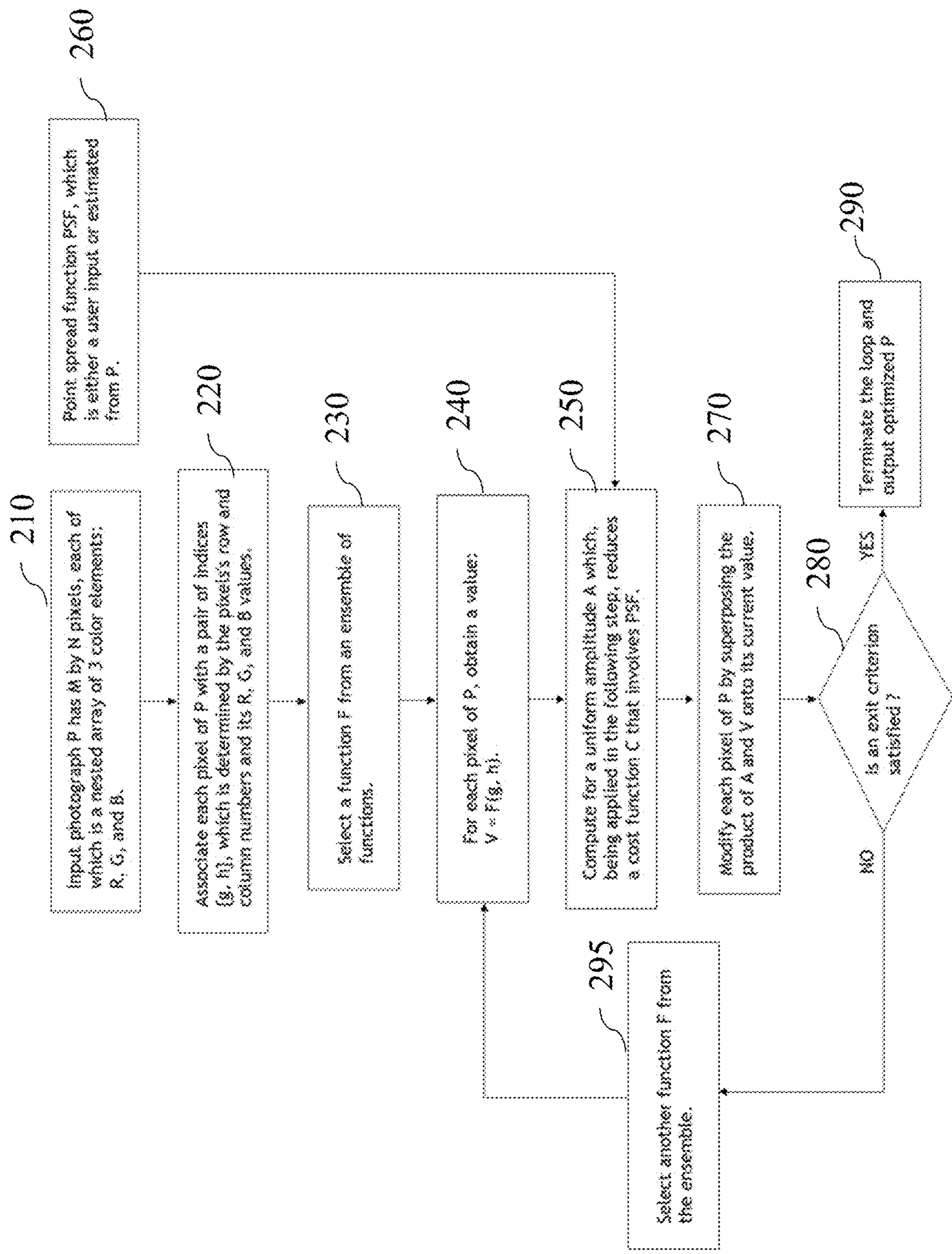
FIG. 2 shows an example method of another embodiment of the disclosed data processing technology.

For sharpening a photograph that is blurry because of a point spread function, or PSF, which characterizes the image-forming process, a computer algorithm may be constructed with elements shown in the flow diagram FIG. 2. At step 210, input photograph P having M by N pixels is obtained. Each of the M by N pixels is a nested array of three color elements including R, G, and B. At step 220, each pixel of P is associated with a pair of indices [g, h], which is determined by the pixel's row and column numbers and its R, G, and B values. At step 230, a function F is selected from an ensemble of functions. At step 240, a value V=F(g,h) is obtained for each pixel of P. At step 250, a uniform amplitude A is computed to reduce a cost function C that involves a point spread function (PSF) obtained from step 260. The PSF is either a user input or estimated from P. In a particular embodiment, the cost function C is the summation of the squared difference between two values: that of the original P pixel and that of the corresponding pixel in a convolution of the altered P with the PSF. At step 270, each pixel of P is modified by superposing the product of A and V onto its current value. At step 280, it is determined whether an exit criterion is satisfied. If yes, the method in FIG. 2 proceeds to step 290. Otherwise, the method in FIG. 2 proceeds to step 295. The exit criterion in the flow diagram in FIG. 2 can be any of these things: a certain number of cycling has been reached (i.e., a certain number of functions have been selected and used or each amplitude A corresponding to the certain number of functions has been adjusted); the cost function has been reduced to a certain value; an input from a user to halt the operation through a user interface. At step 290, the loop is terminated, and the optimized P is outputted. At step 295, another function F is selected from the ensemble.

Figure 3A:
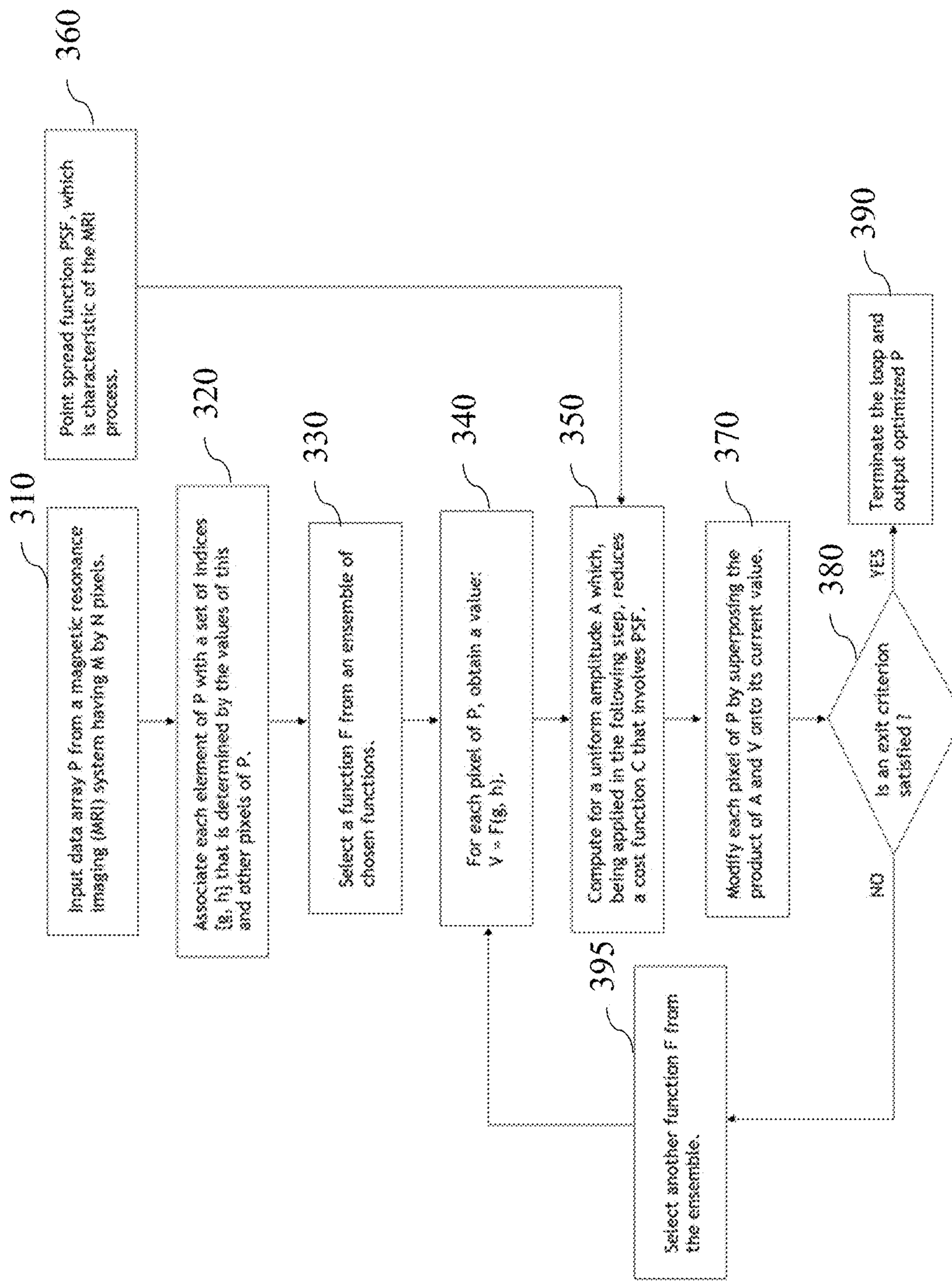
FIG. 3A shows an example method of MRI imaging processing based on an implementation of the embodiment in FIG. 2.

Based on the above disclosed techniques, a computer algorithm can be built to enhance and sharpen images generated through a medical imaging modality including positron emission tomography (PET scan), magnetic resonance imaging (MRI), computed tomography, sonography, optical coherence tomography and x-ray based radiography. The flow diagram shown in FIG. 3A shows a method of enhancing images from an MRI system. At step 310, input data array P having M by N pixels from an MRI system is obtained. At step 320, each pixel of P is associated with a set of indices [g, h], which is determined by the values of this pixel and other pixels of P. At step 330, a function F is selected from an ensemble of chosen functions. At step 340, a value V=F(g,h) is obtained for each pixel of P. At step 350, a uniform amplitude A is computed to reduce a cost function C that involves a point spread function (PSF) obtained from step 360. The PSF is characteristic of the MRI process. In a particular embodiment, the cost function C is the summation of the squared difference between two values: that of the original P pixel and that of the corresponding pixel in a convolution of the altered P with the PSF. At step 370, each pixel of P is modified by superposing the product of A and V onto its current value. At step 380, it is determined whether an exit criterion is satisfied. If yes, the method in FIG. 3A proceeds to step 390. Otherwise, the method in FIG. 3A proceeds to step 395. The exit criterion in the flow diagram in FIG. 3A can be any of these things: a certain number of cycling has been reached (i.e., a certain number of functions have been selected and used or each amplitude A corresponding to the certain number of functions has been adjusted); the cost function has been reduced to a certain value; an input from a user to halt the operation through a user interface. At step 390, the loop is terminated and the optimized P is outputted. At step 395, another function F is selected from the ensemble.

In magnetic resonance imaging, or MRI, the intrinsic resolution of the images is limited, to a large degree, by the properties of the imaging hardware, specifically, by the strength and gradients of the magnetic fields during acquisition and by the placement and physical properties of the receivers for the electromagnetic waves. Presently, MIR imaging typically has rather coarse sampling grids because of the poor localization of signals: denser sampling grids will not yield better images because of the poor localization of the signals. The digital image sharpening technique described in the invention is capable of retrieving and separating spatially overlaid information due to poor signal localization in MRI imaging. The technique disclosed in this application offers a way of improving the resolution of an MRI imaging system through oversampling followed by the digital image enhancement disclosed in this application. The diagram shown in FIG. 3B illustrates how the invented computer algorithm can be implemented in an MRI image system to achieve image resolutions beyond the limitation imposed by the hardware. FIG. 3B (A) is the conventional MRI image forming process that starts by using an MRI system to record data for conventional spatial sampling density and forming MRI images through conventional computation technique. The MRI images generated using the conventional MRI image forming process have resolutions limited by the properties of the MRI system. FIG. 3B (B) is a signal processing flow that yields image resolutions beyond the conventional method. The signal process flow starts by using an MRI system to record data for oversampling in space, forming MRI images through conventional computation, and applying the disclosed method in FIG. 3A to retrieve and separate spatially overlaid information to generate the MRI images with resolutions beyond the limitations imposed by the MRI system.

Figure 4:
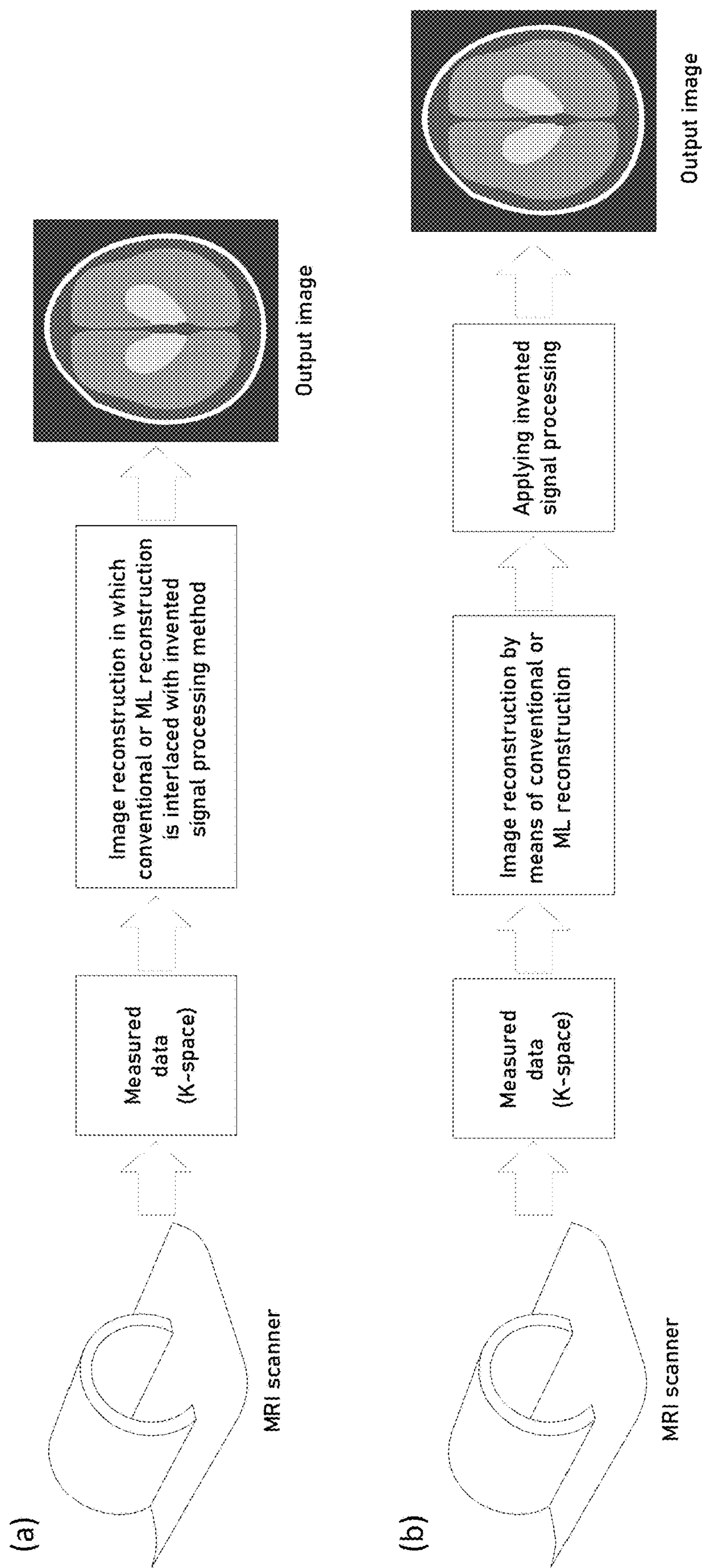
FIG. 4 shows an example of combing invented method with a conventional or a machine learning (ML) reconstruction technique is illustrated in FIG. 4(*a*). The disclosed data processing can also be employed in series with a conventional or a ML reconstruction techniques as illustrated in FIG. 4(*b*).

In low-magnetic-field MRI systems, the detected signals are more weekly encoded with their spatial information in the tissue and are more noisy. Conventional MRI image reconstruction methods often fail to produce images with adequate quality for diagnoses. To overcome this problem artificial intelligence (AI) in the form of machine learning (ML) can be employed. The disclosed data processing technology in this patent document can be used alone for MRI image reconstruction in low-field MRI scanners. In addition, the present technology in this document can also be used in conjunction with the conventional reconstruction technique or with a ML reconstruction techniques to further enhance the MRI imaging quality. FIG. 4 shows an example of combing invented method with a conventional or a machine learning (ML) reconstruction technique is illustrated in FIG. 4(*a*). The disclosed data processing can also be employed in series with a conventional or a ML reconstruction techniques, as illustrated in FIG. 4(*b*).

The disclosed data processing technology can be implemented to provide an algorithm for altering an array P, each element of which is itself a nested array having S elements, for a specific objective, including these steps:

1. Associate each element of P with a set of additional indices, T, whose values are dependent on the properties of this and other elements of P.
2. Modify the values of P elements by superposing the product of an amplitude A and the values of a function F belonging to an ensemble of functions that take said T as input variables, wherein the value of A is computed such that the result of the superposition is an altered P that is a step closer to said objective.
3. Repeat Step 2, each time a different F in said ensemble and a different A are adopted until an exit criterion is satisfied.

In one implementation, the above algorithm can be used for sharpening a photograph, where the array P is an array of pixel data of a digital photograph, and said the above ensemble of functions can be a set of orthonormal functions.

In another implementation, the above algorithm can be used for sharpening an image and revealing more details, wherein the array P is produced by magnetic resonance imaging (MRI) or other medical imaging modalities, and said the ensemble of functions can be a set of orthonormal functions.

In another implementation, the above algorithm can be used for forming images of celestial objects, wherein the array P is constructed by data collected from a synthetic aperture array for astronomical imaging or for other purposes.

In yet another implementation, a magnetic resonance imaging (MRI) system can be constructed by incorporating two features. The first feature is oversampling: the K-space data are recorded with frequency intervals smaller than what is in the normal MRI procedure; the second is the application of a signal deconvolution based on the disclosed data processing technology to produce high resolution images.

An image quality may be constrained by physical limitations of the imaging apparatus that produces the image and random noises. It is desirable to provide methods and systems that may overcome the limitation imposed by the imaging apparatus to convert a blurred image produced by the imaging apparatus to an output image with enhanced image quality. In some implementations of the disclosed technology, a method for processing data is provided. The method includes representing original data in form of a number array with one or more row elements and one or more column elements that are based on the original data; re-arranging elements of the number array based on properties of corresponding elements in the number array, respectively, and properties of other elements of the number array to form a re-arranged number array; modifying values of elements of the re-arranged number array by superposing a product of an amplitude variable A and values of a function F selecting from an ensemble of functions, wherein the value of the amplitude variable A is computed to optimize a cost function associated with the amplitude variable A, the respective function F, values of elements of the number array, and values of elements of re-arranged number array; and re-arranging the elements of re-arranged number array with the modified values of elements to generate a modified number array.

In some implementations of the disclosed technology, a method for processing data, comprising representing original data in form of a number array with one or more row elements and one or more column elements that are based on the original data, associating each element the number array with a set of indices arranged in an index array having row and column numbers matching row and column number of the number array, wherein values of the indices are dependent on properties of corresponding elements in the number array, respectively, and properties of other elements of the number array, modifying values of elements of the number array by superposing a product of an amplitude variable A and values of a function F selecting from an ensemble of functions that are generated by using values of the indices in the index array as input variables to the function F, wherein the value of the amplitude variable A is computed to optimize a cost function associated with the amplitude variable A, the respective function F, values of elements of the number array, and values of the indices of the index array; and generating a modified number array using the modified values of elements of the number array.

In some implementations of the disclosed technology, a method of improving an image quality of a first image generated by an imaging apparatus and represented by a first number array is provided. The method includes designating an index to each of a plurality of pixels of the first number array based on one or more features of the pixel relative to other pixels of the first number array; adjusting an amplitude variable for each of one or more functions to optimize a cost function associated with the amplitude variable, the respective function, a plurality of pixel values, and a plurality of designated indexes; updating the plurality of pixel values based on the adjusted amplitude variable after each amplitude variable corresponding to the one or more functions is adjusted to optimize the cost function; and generating an output image represented by a second number array having a plurality of output image pixels formed by updated pixel values with an enhanced image quality.

In some implementations of the disclosed technology, a non-transitory computer readable storage medium comprising machine-readable instructions that upon execution by one or more processors, are configured to cause the one or more processors to perform a method is provided. The method includes obtaining an original image from an imaging apparatus; processing pixels in the original image to generate a first image having a plurality of first pixels with more pixels than the original image; designating an index to each of a plurality of pixels of the first number array based on one or more features of the pixel relative to other pixels of the first number array; adjusting an amplitude variable for each of one or more functions to optimize a cost function associated with the amplitude variable, the respective function, a plurality of pixel values, and a plurality of designated indexes; updating the plurality of pixel values based on the adjusted amplitude variable after each amplitude variable corresponding to the one or more functions is adjusted to optimize the cost function; and generating an output image represented by a second number array having a plurality of output image pixels formed by updated pixel values with an enhanced image quality.

Figure 5:
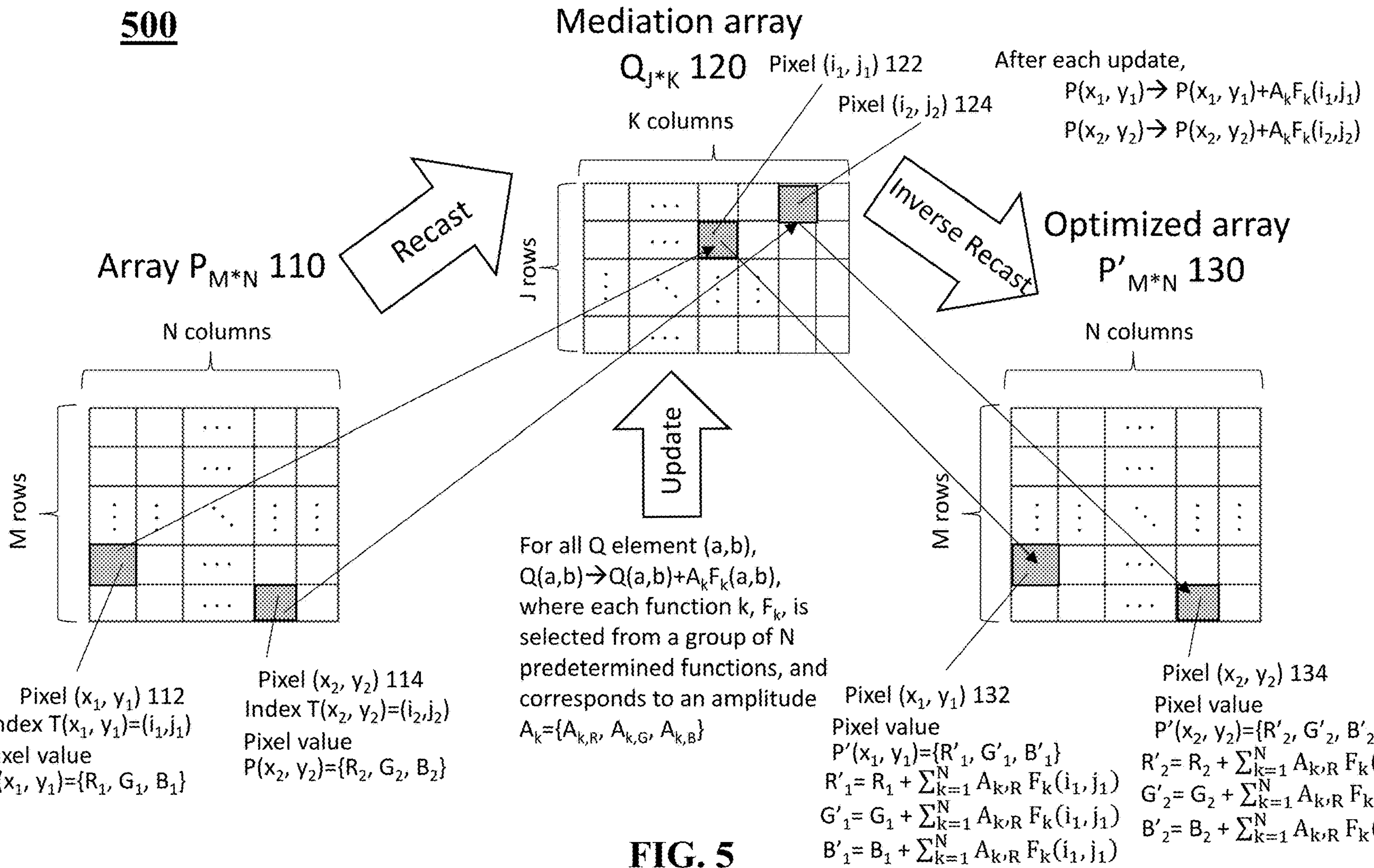
FIG. 5 shows an example of one implementation of the data processing in the embodiment in FIG. 1.

FIG. 5 shows an example of one implementation of the data processing in the embodiment in FIG. 1. The data processing method starts a number array $P_{M*N}$ 110 having M*N pixels arranged in M rows and N columns, where both M and N are positive integers. In an embodiment, each pixel value of the number array $P_{M*N}$ 110 is a number. In an embodiment, each pixel value of the number array $P_{M*N}$ 110 is a nested array denoted by {R, G, B}, where R, G, B represent different color signal values (for example, R represents a number corresponding to the red color component of the pixel, G represents a number corresponding to the green color component of the pixel, and B represents a number corresponding to the blue color component of the pixel).

Each pixel (x,y) of the number array $P_{M*N}$ 110 is designated with an index T(x,y). The first number of the coordinate, x, of the pixel (x, y) means the number of row in which the pixel (x, y) is located in the number array $P_{M*N}$ 110, and the second number of the coordinate, y, of the pixel (x, y) means the number of column in which the pixel (x, y) is located in the number array $P_{M*N}$ 110. For example, pixel $(x_1,y_1)$ 112 having the coordinate $(x_1, y_1)$ in the number array $P_{M*N}$ 110 and a pixel value of $P(x_1,y_1)=\{R_1, G_1, B_1\}$ is designated with an index $T(x_1, y_1)=(i_1, j_1)$. Pixel $(x_2,y_2)$ 114 having the coordinate $(x_2, y_2)$ in the number array $P_{M*N}$ 110 and a pixel value of $P(x_2,y_2)=\{R_2, G_2, B_2\}$ has an index $T(x_2,y_2)=(i_2,j_2)$. In some embodiment, one or more pixels of the number array $P_{M*N}$ 110 having different coordinates may have the same index.

In an embodiment, the index T(x,y) of the pixel (x,y) of the number array $P_{M*N}$ 110 is determined based on one or more features of the pixel (x,y) relative to the other pixels in the number array $P_{M*N}$ 110. In addition or alternatively, the index T(x,y) of the pixel (x,y) may depend on the properties of the number array $P_{M*N}$ 110, the function $f_k$ (to be discussed in greater details below), and the objective of implementing the image sharpening process. In some embodiments, the one or more features of the pixel (x,y) may include one or more color components of the pixel (x,y). Accordingly, the index T(x,y) of the pixel (x,y) is determined based on the respective R, G, and B values of the pixel (x,y) with relative to the other pixels in the number array $P_{M*N}$ 110. As a result, the pixels with the same or similar values in the specific one or more color components may have the same or similar indexes, and the final, output color image may have an enhanced contrast in the one or more color components. For example, red and reddish pixels in the number array $P_{M*N}$ 110 may be assigned with small indexes and the blue and blueish pixels in the number array $P_{M*N}$ 110 may be assigned with large indexes. If a function $F_k$ (to be discussed in greater details below) turns pixels with small indexes to pure red and turns pixels with large indexes to pure blue, the final, output color image may therefore have an enhanced red-blue color contrast, which may be aligned with an objective of the image sharpening process.

In some embodiments, the index T(x,y) of the pixel (x,y) is determined based on the value of the pixel (x,y) with relative to the other pixels in the number array $P_{M*N}$ 110. The data processing method proceeds to convert the number array $P_{M*N}$ 110 to a mediation number array $Q_{J*K}$ 120 by rearranging (recasting) each pixel (x, y) in the number array $P_{M*N}$ 110 to the respective pixel (T(x,y)) in the mediation number array $Q_{J*K}$ 120. As such, the index of the pixel (x, y) in the number array $P_{M*N}$ 110, T(x,y), is the coordinate of the pixel in the mediation number array $Q_{J*K}$ 120 that the pixel (x, y) in the number array $P_{M*N}$ 110 moves to. In some embodiments, the recasting is implemented by assigning each pixel value P(x, y) in the number array $P_{M*N}$ 110 to pixel (T(x,y)) in the mediation number array $Q_{J*K}$ 120. The mediation number array $Q_{J*K}$ 120 has J*K pixels arranged in J rows and K columns, where both J and K are positive integers. In an embodiment, a product of J and K is equal to the product of M*N, meaning the mediation number array $Q_{J*K}$ 120 has the same number of pixels as the number array $P_{M*N}$ 110. In an embodiment, the product of J and K is not equal to the product of M*N, meaning the mediation number array $Q_{J*K}$ 120 has a different number of pixels as the number array $P_{M*N}$ 110. For example, as shown in FIG. 5, pixel $(x_1, y_1)$ 112 and pixel $(x_2, y_2)$ 114 in the number array $P_{M*N}$ 110 may be rearranged to pixel $(i_1, j_1)$ 122 and pixel $(x_2, j_2)$ 124, respectively, in the mediation number array $Q_{J*K}$ 120 as directed by arrow in FIG. 5. In addition, the value of the pixel $(i_1, j_1)$ 122 and the value of pixel $(i_2, j_2)$ 124 of the mediation number array $Q_{J*K}$ 120, denoted by Q(i, j) and $Q(i_2,j_2)$, respectively, are nest arrays. Specifically, $Q(i_1,j_1)=P(x_1, y_1)$, and $Q(i_2,j_2)=P(x_2, y_2)$. In some embodiments, the pixel value in the mediation number array $Q_{J*K}$ 120 may also include the coordinates of the corresponding pixel in the number array $P_{M*N}$ 110 associated with the pixel values $P(x_1, y_1)$ and $P(x_2, y_2)$, respectively to facilitate the inverse recasting process as discussed below. In some embodiments, at least one of the pixels in the mediation number array $Q_{J*K}$ 120 may correspond to two or more pixels having the same indexes in the number array $P_{M*N}$ 110.

The data processing method then proceeds to update the pixel values of the mediation number array $Q_{J*K}$ 120 based on a group of N predetermined functions $f_1, f_2, \ldots, f_N$, where N is a positive integer. Sometimes, each predetermined function $f_k$ may also be referred to as a kernel filter, where k may be any positive integer between 1 and N (including both 1 and N). In an embodiment, the group of N predetermined functions $f_1, f_2, \ldots, f_N$ is a group of mathematically orthonormal functions. In an embodiment, each of group of N predetermined functions $f_1, f_2, \ldots, f_N$ is a trigonometry function, a discrete Fourier transform, a Zernike function, a Walsh function, or a Hadamard transform. In an embodiment, none of the group of N predetermined functions $f_1, f_2, \ldots, f_N$ is mathematically orthonormal.

To update the pixel values of the mediation number array $Q_{J*K}$ 120 based on each function $F_k$, a function value, $F_k(T(x,y))$ is determined for each of the pixels in the mediation number array $Q_{J*K}$ 120. An amplitude variable, $A_k$ is determined corresponding to each function $F_k$ by optimizing a cost function. The cost function indicates a difference between (1) the original number array $P_{1,M*N}$ and (2) a number array obtained by convolving the updated number array $P_{M*N}$ 110 with a PSF. A non-limiting example of the cost function, denoted by CF, may be expressed by:

$$CF=\Sigma_{x,y}[P_1(x,y)-(P_{M*N}'\oplus PSF)(x,y)]^2 \quad (1)$$

where $P'_{M*N}$ represents the updated number array corresponding to the function $F_k$ and amplitude variable $A_k$, and the pixel value of pixel (x, y) in the updated number array, P'(x, y), may be expressed by $P'(x, y)=P(x, y)+A_kF_k(T(x,y))$.

In an embodiment, the amplitude variable, $A_k$ may be adjusted until the cost function, for example, the cost function as expressed by equation (1) is minimized. In some embodiments, the amplitude variable, $A_k$ may be found by applying an algorithm, such as the Gauss-Newton algorithm, the Levenberg-Marquardt algorithm, the Broyden-Fletcher-Goldfarb-Shanno algorithm, the gradient descent algorithm, the simulated annealing algorithm, the interior point algorithm, and the genetic algorithm.

In some embodiments, the amplitude $A_k$ has the same dimensions as each pixel value of the number array $P_{M*N}$ 110. Because the function value, $F_k(i,j)$ is a number, the product of the function value, $F_k(i,j)$, and the amplitude variable, $A_k$ has the same dimension as each pixel value of the number array $P_{M*N}$ 110. Accordingly, the value of the amplitude variable, $A_k$ can be expressed as $\{A_{k,R}, A_{k,G}, A_{k,B}\}$ in the example as shown in FIG. 5.

In some embodiments, each pixel value of the mediation number array $Q_{J*K}$ 120 is updated by superposing a product of the function value, $F_k(T(x,y))$, and the amplitude variable, $A_k$ to the existing pixel value of the mediation number array $Q_{J*K}$ 120. For example, the pixel value of pixel $(i_1, j_1)$ 122 of the mediation number array $Q_{J*K}$ 120, Q(i, j) may be updated to $Q(i_1, j_1)+A_kF_k(i, j)$. Because $Q(i_1, j_1)=P(x_1, y_1)$, $P(x_1, y_1)$ is updated to $P(x_1, y_1)+A_kF_k(i_1, j_1)/P(x_2, y_2)$ is updated to $P(x_2, y_2)+A_kF_k(i, j)$. In some embodiments, a pixel of the mediation number array $Q_{J*K}$ 120 includes two or more pixel values of the number array $P_{M*N}$ 110. Accordingly, the two or more pixel values of the number array $P_{M*N}$ 110 included in any pixel of the mediation number array $Q_{J*K}$ 120 are updated in the same way, suppressing the amplification of noises.

After the pixel values of the mediation number array $Q_{J*K}$ 120 are updated for all of the group of N predetermined functions $f_1, f_2, \ldots, f_N$, the pixel value $P(x_1, y_1)$ becomes $P(x_1,y_1)+\Sigma_{k=1}^{N}A_kF_k(i_1,j_1)$ and the pixel value $P(x_2, y_2)$ becomes $P(x_2,y_2)+\Sigma_{k=1}^{N}A_kF_k(i_2,j_2)$. The mediation number array $Q_{J*K}$ 120 is then converted to the optimized array $P'_{M*N}$ 130, which has the same dimension as the number array $P_{M*N}$ 110, by assigning the updated pixel values P(x, y) in each of the pixel (T(x,y)) in the mediation number array $Q_{J*K}$ 120 to pixel (x, y) in the optimized array $P'_{M*N}$ 130.

In an embodiment, the pixel value (x, y) in the optimized array $P'_{M*N}$ 130 may be denoted by P'(x, y)={R', G', B'}. For example, the updated pixel value $P(x_1, y_1)$ of pixel $(i_1, j_1)$ of the mediation number array $Q_{J*K}$ 120 and the updated pixel value $P(x_2, y_2)$ of pixel $(i_2, j_2)$ of the mediation number array $Q_{J*K}$ 120 may be assigned to pixel $(x_1,y_1)$ 132 and pixel $(x_2, y_2)$ 134 of the optimized array $P'_{M*N}$ 130 as directed by arrow in FIG. 5. The pixel value of pixel $(x_1,y_1)$ 132 of the optimized array $P'_{M*N}$ 130, denoted by $P'(x_1,y_1)$, is $\{R'_1, G'_1, B'_1\}$, where $R_1'=R_1+\Sigma_{k=1}^{N}A_kF_k(i_1, j_1)$, $G_1'=G_1+\Sigma_{k=1}^{N}A_kF_k(i_1, j_1)$, and $B_1'=B_1+\Sigma_{k=1}^{N}A_kF_k(i_1, j_1)$. The pixel value of pixel $(x_2,y_2)$ 134 of the optimized array $P'_{M*N}$ 130, denoted by $P'(x_2,y_2)$, is $\{R'_2, G'_2, B'_2\}$, where $R_2'=R_2+\Sigma_{k=1}^{N}A_kF_k(i_2, j_2)$, $G_2'=G_2+\Sigma_{k=1}^{N}A_kF_k(i_2, j_2)$, and $B_2'=B_2+\Sigma_{k=1}^{N}A_kF_k(i_2, j_2)$.

Figure 6A:
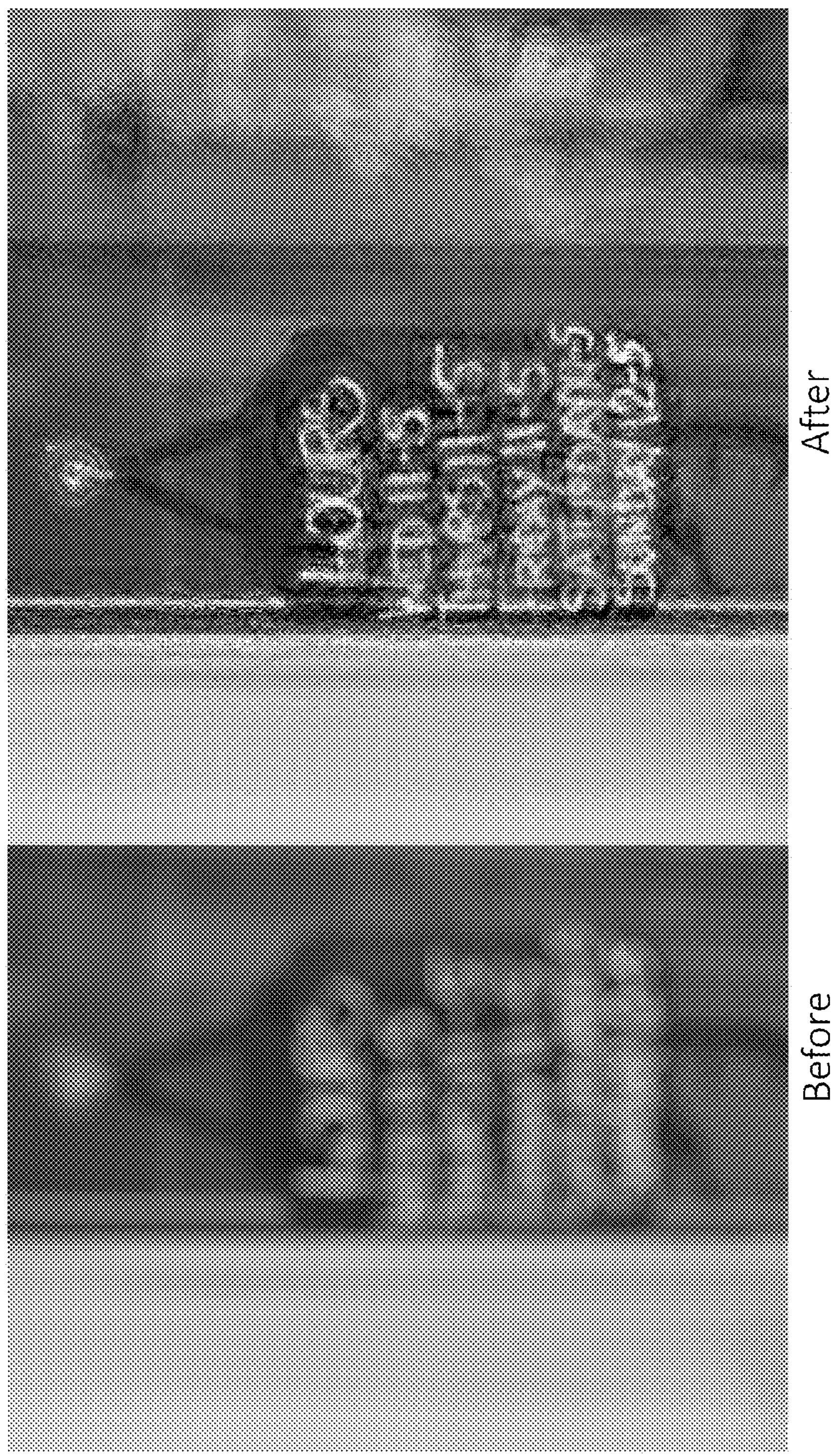
FIG. 6A shows an example of an original, blurred image captured by a camera.
Figure 6B:
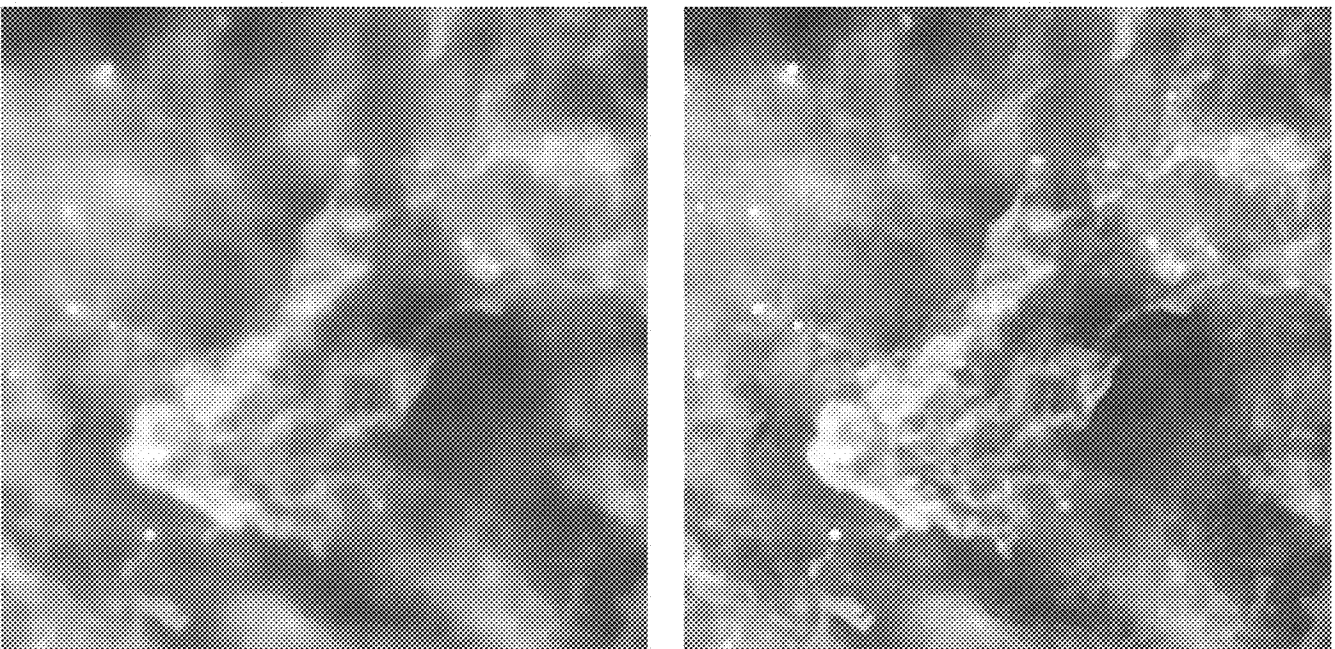
FIG. 6B shows a sharpened image with an improved image quality after performing the data processing disclosed in this patent document on the original, blurred image of FIG. 6A.

FIG. 6A shows an example of an original, blurred image captured by a camera. FIG. 6B shows a sharpened image with an improved image quality after performing the data processing disclosed in this patent document on the original, blurred image of FIG. 6A.

FIG. 6B shows an example for using the present data processing technology to transform an original NASA image with some blurring into a higher quality image using the disclosed data processing to reduce the blurring and to improve the image resolution.

Figure 7:
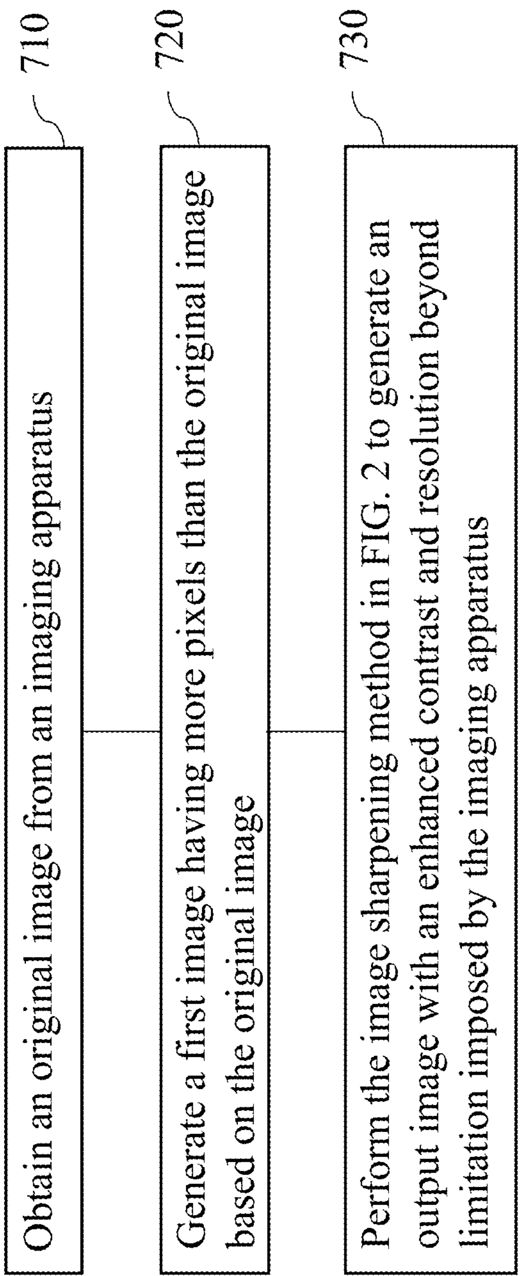
FIG. 7 depicts a flowchart for an example image sharpening method for improving an image quality.

FIG. 7 depicts a flowchart for an example image sharpening method 700 for improving an image quality. Specifically, the image sharpening method 700 may be used to generate a super-resolution image based on an original image provided by an imaging apparatus. The super-resolution image includes more resolutions (pixels) and provide more details than the original image.

At step 710, the original image is obtained from the imaging apparatus. The imaging apparatus may be in various configurations, including, for example, a telescope, a camera, a light sensor, a radio receiver, an MRI system, an X-ray imaging system, a CT system, a PET system, a radar, a synthetic aperture array, or a LIDAR.

At step 720, a first image having more pixels than the original image is generated based on the original image. In some embodiments, the first image is generated by performing oversampling on the original image. In an embodiment, the first image is converted from the original image by performing oversampling on the original image. To accomplish the oversampling on the original image, the original image may be interpolated to increase the number of pixels in it through one or more interpolation techniques, such as bilinear or bicubic interpolation. For a bilinear interpolation, the value of a new pixel in bilinear interpolation is determined as a weighted average of the values of its four nearby pixels in the original image. For a bicubic interpolation, a comparable weighted average is generated using a R-by-R pixel region surrounding the new pixel in bicubic interpolation, where R is an integer, for example, R may be equal to 4.

At step 730, the image sharpening method 700 is performed to generate an output image with an enhanced contrast and resolution beyond the limitation imposed by the imaging apparatus that provides the original image. In an embodiment, the output image may also be referred to as a super-resolution image.

Figure 11:
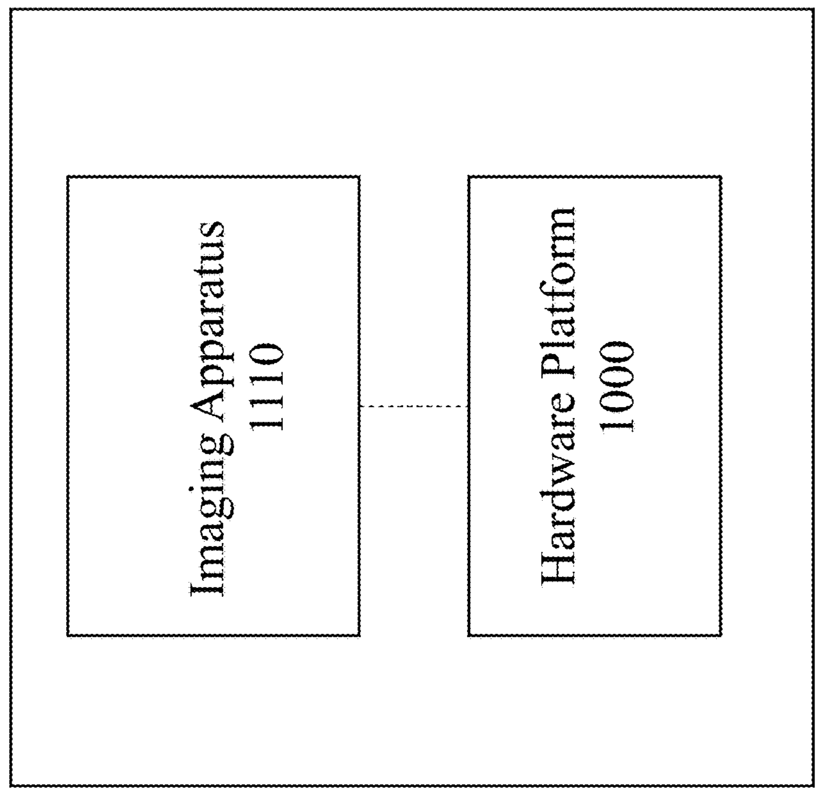
FIG. 11 shows an imaging system comprising an imaging apparatus and the hardware platform in FIG. 10.
Figure 12:
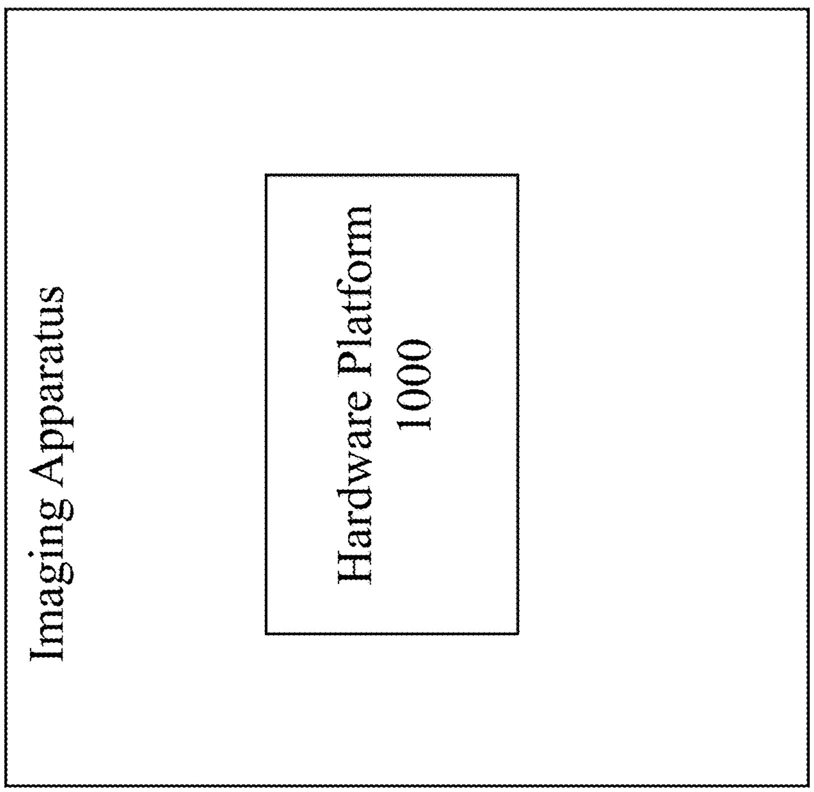
FIG. 12 shows an imaging apparatus integrated with the hardware platform in FIG. 10 in the imaging apparatus.

In some embodiments, methods in FIGS. 2, 3, and 7 may be implemented by a software application (for example, the machine-readable instructions 1025 in FIG. 10) that is installed in a computer system (for example, the hardware platform 1000). In some embodiments, the computer system can be separate from the imaging apparatus. For example, as shown in FIG. 11, the hardware platform 1000 is separate from the imaging apparatus 1110. The computer system may be a stand-alone system or part of a different kind of apparatus. In some embodiments, the computer system can be part of the imaging apparatus. For example, as shown in FIG. 12, the hardware platform 1000 is part of the imaging apparatus 1200.

Figure 8:
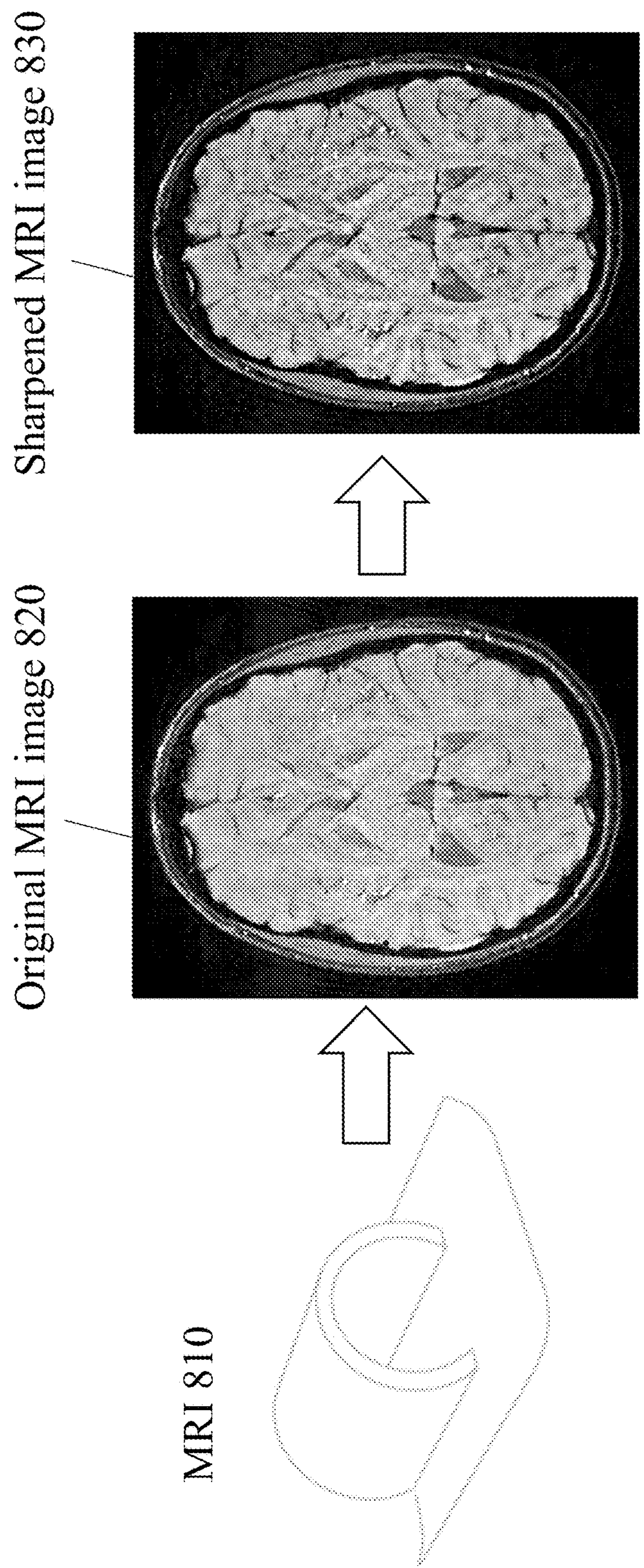
FIG. 8 shows an example of using the image sharpening method in FIG. 3A to convert an original Magnetic resonance imaging (MRI) image to a sharpened MRI image with enhanced contrast and resolution beyond the limitation imposed by the MRI machine.

FIG. 8 shows an example of using the image sharpening method 700 in FIG. 7 to convert an original MRI image 820 to a sharpened MRI image 830 with enhanced contract and resolution beyond the limitation imposed by the MRI system 810 that produces the original MRI image 820.

Figure 9A:
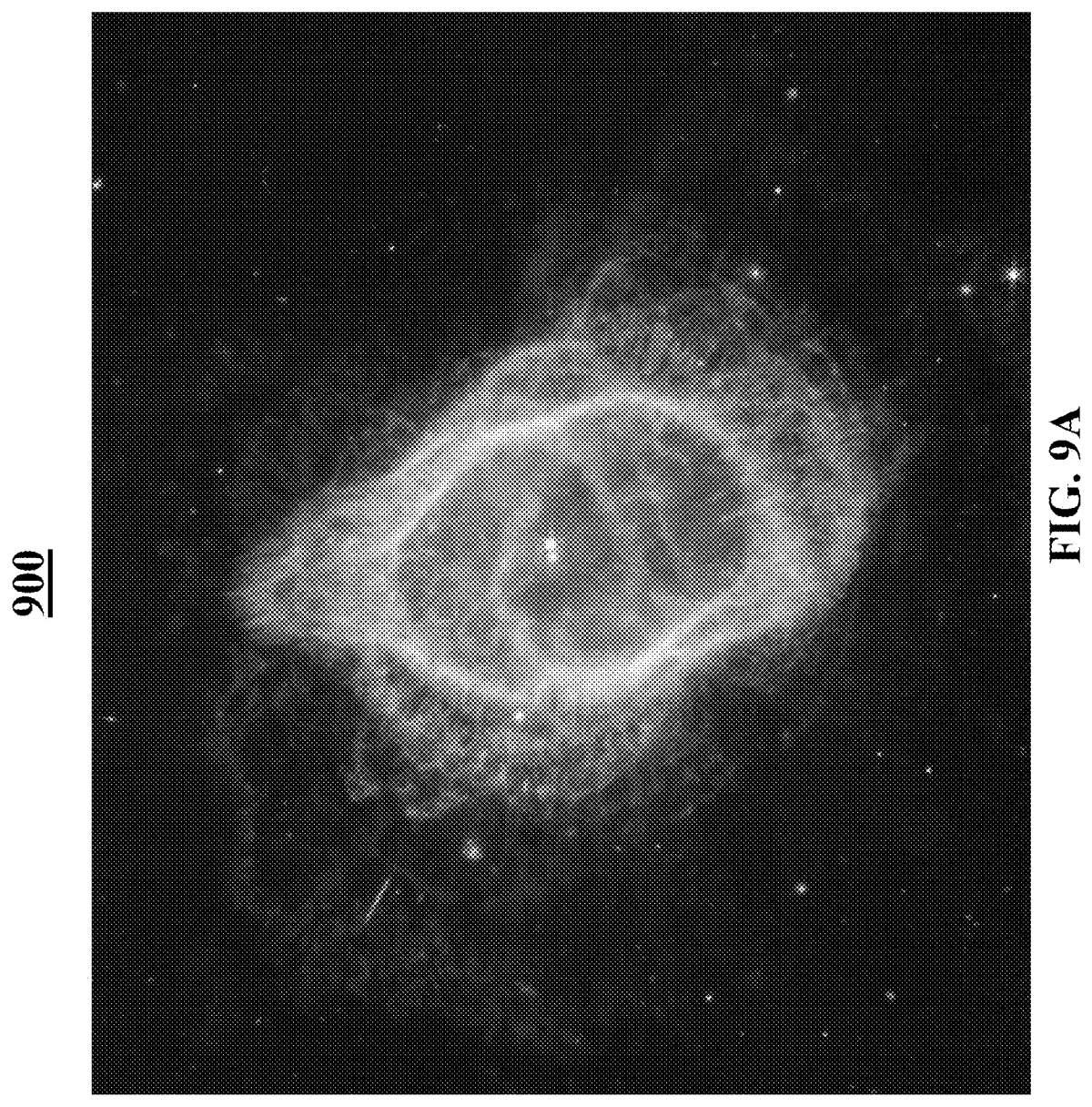
Figure 9B:
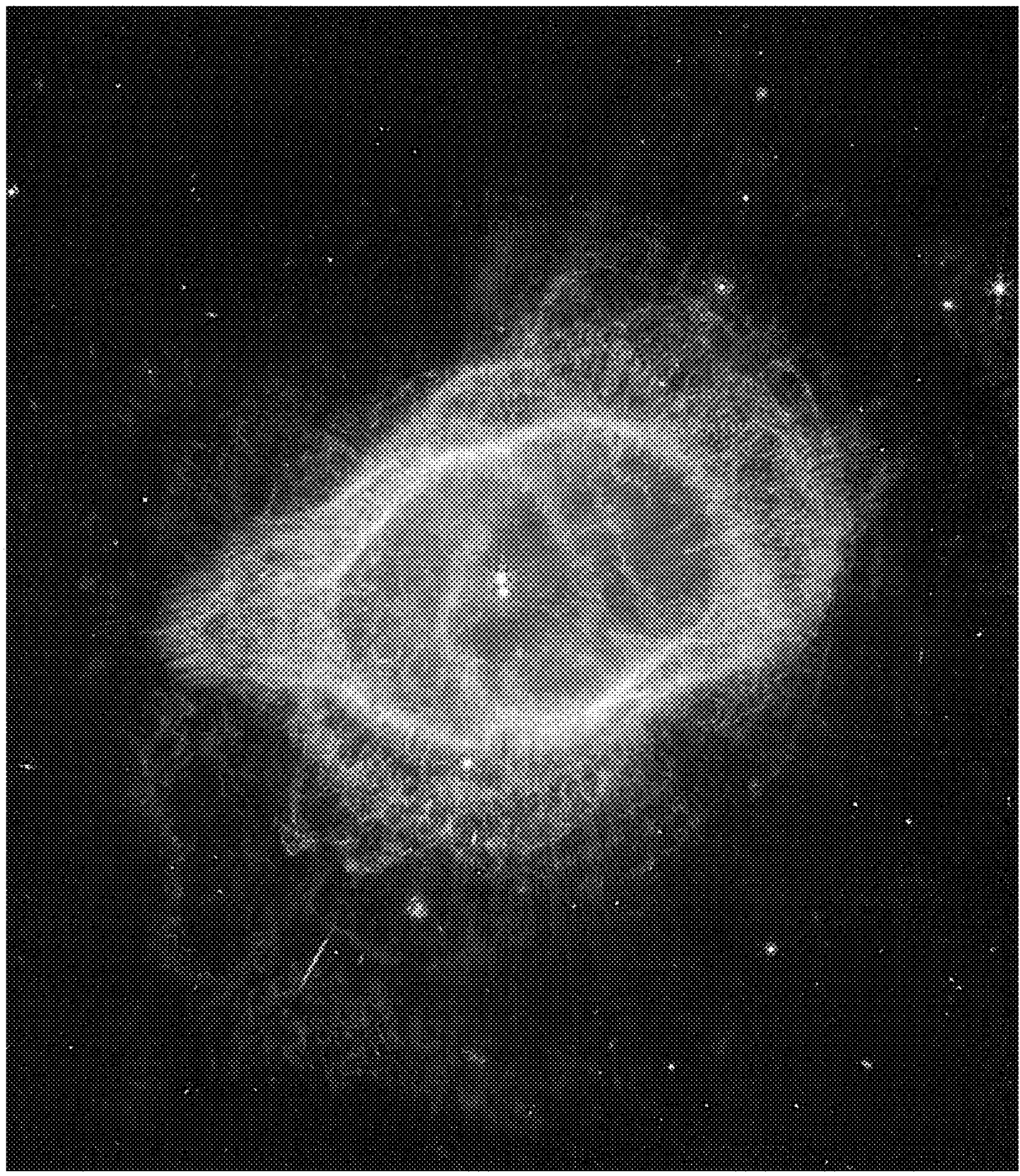
FIG. 9B shows a sharpened image with enhanced contrast and resolution by performing the image sharpening method in FIG. 7 on the original, blurred image in FIG. 9A.

FIG. 9A shows an original, blurred image 900 from the Webb telescope. FIG. 9B shows a sharpened image 950 with enhanced contrast and resolution by performing the method 700 in FIG. 7 with respect to the original, blurred image 900.

Figure 10:
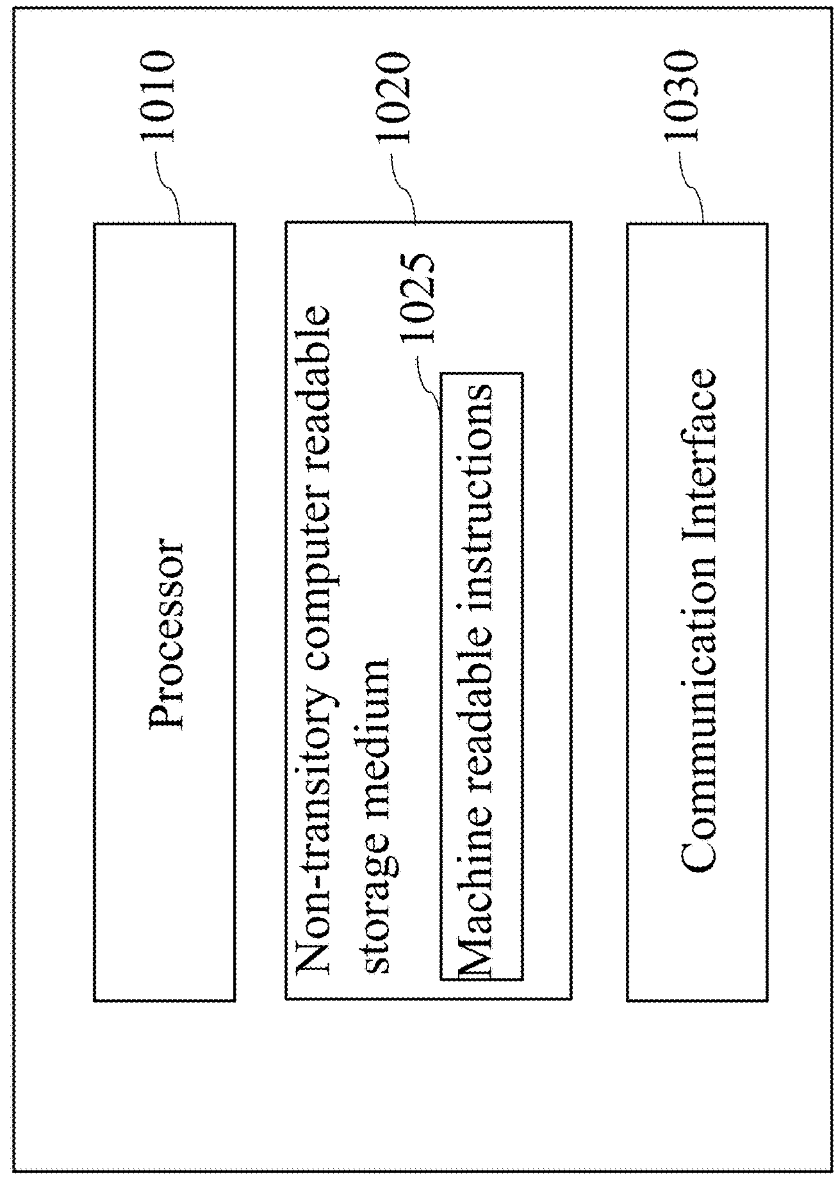
FIG. 10 shows an example of a hardware platform configured to implement at least some of the methods described in the present disclosure.

FIG. 10 shows an example of a hardware platform 1000 configured to implement at least some of the methods in FIGS. 2, 3, and 7 described in the present disclosure. The hardware platform 1000 may include one or more processors 1010 that can execute an executable program 1025 to instruct and control the one or more processors 1010 to implement a method in FIG. 2, 3, or 7. The hardware platform 1000 may include a non-transitory computer readable storage medium 1020 that may be used to store one or more executable programs 1025 (i.e., executable computer codes or machine-readable instructions) and/or store data. The hardware platform 1000 may further include a communication interface 1030. For example, the communication interface 1030 may implement one or more wired or wireless communication protocols (Ethernet, LTE, Wi-Fi, Bluetooth, and so on). In some embodiments, the communication interface 1030 includes a user interface configured to receive user inputs. The hardware platform 1000 may be used for implementing the offline server or the online server. In some embodiments, the one or more processor 1010 may be configured to implement method in FIG. 2, 3, or 7 by executing a software application that may be included in the executable programs 1025 stored in the non-transitory computer readable storage medium 1020.

FIG. 11 shows an imaging system 1100 comprising an imaging apparatus 1110 and the hardware platform 1000 in FIG. 10. In some embodiments, the imaging apparatus 1110 may be in various configurations, including, for example, a telescope, a camera, a light sensor, a radio receiver, an MRI system, an X-ray imaging system, a CT system, a PET system, a radar, a synthetic aperture array, or a LIDAR.

As shown in FIG. 11, the hardware platform 1000 is separate from the imaging apparatus 1110. For example, the hardware platform 1000 may be a stand-alone system or part of a different kind of apparatus. In an embodiment, the imaging apparatus 1110 is in communication with the hardware platform 1000 so that an image generated by the imaging apparatus 1110 may be transmitted to the hardware platform 1000 directly for implementing the methods in FIG. 2, 3, or 7. In an embodiment, the imaging apparatus 1110 is separate from and not in direct communication with the hardware platform 1000.

FIG. 12 shows an imaging apparatus 1200 integrated with the hardware platform 1000 in FIG. 10 in the imaging apparatus 1200. As shown in FIG. 12, the hardware platform 1000 is part of the imaging apparatus 1200.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various components in the embodiments described in this patent document should not be understood as requiring such separation in all embodiments.

Only a few implementations and examples are described, and other implementations enhancements and variations can be made based on what is described and illustrated in this patent document.

What is claimed is:

1. A method for processing data, comprising:

representing original data in form of a number array with one or more row elements and one or more column elements that are based on the original data;

re-arranging elements of the number array based on properties of corresponding elements in the number array, respectively, and properties of other elements of the number array to form a re-arranged number array;

modifying values of elements of the re-arranged number array by superposing a product of an amplitude variable A and values of a function F selecting from an ensemble of functions, wherein the value of the amplitude variable A is computed to optimize a cost function associated with the amplitude variable A, the respective function F, values of elements of the number array, and values of elements of re-arranged number array; and re-arranging the elements of re-arranged number array with the modified values of elements to generate a modified number array.

2. The method of claim 1, wherein the cost function is a summation of squared differences between the values of elements of the number array and corresponding pixel values of a third number array obtained by convolving a point spread function (PSF) with a fourth number array obtained by adding to each value of elements of the re-arranged number array a product of the amplitude variable A and a value of the function F with respect to a coordinate associated with the value of element of the re-arranged number array.

3. The method of claim 2, wherein the function F selected from the ensemble of functions is mathematically orthonormal.

4. A method for processing data, comprising:

representing original data in form of a number array with one or more row elements and one or more column elements that are based on the original data;

associating elements of the number array with a set of indices arranged in an index array having row and column numbers matching row and column number of the number array, wherein values of the indices are dependent on properties of corresponding elements in the number array, respectively, and properties of other elements of the number array;

modifying values of elements of the number array by superposing a product of an amplitude variable A and values of a function F selecting from an ensemble of functions that are generated by using values of the indices in the index array as input variables to the function F, wherein the value of the amplitude variable A is computed to optimize a cost function associated with the amplitude variable A, the respective function F, values of elements of the number array, and values of the indices of the index array; and generating a modified number array using the modified values of elements of the number array.

5. The method of claim 4, wherein the original data is provided by an imaging apparatus that includes a telescope, a camera, a light sensor, a radio receiver, a magnetic resonance imaging (MRI) system, an X-ray imaging system, a computerized tomography (CT) system, a positron emission tomography (PET) system, a radar, a synthetic aperture array, or a light detection and ranging system (LIDAR).

6. The method of claim 4, wherein the function F selected from the ensemble of functions is mathematically orthonormal.

7. A method of improving an image quality of a first image generated by an imaging apparatus and represented by a first number array, comprising:

designating an index to each of a plurality of pixels of the first number array based on one or more features of the pixel relative to other pixels of the first number array;

adjusting an amplitude variable for each of one or more functions to optimize a cost function associated with the amplitude variable, the respective function, a plurality of pixel values, and a plurality of designated indexes;

updating the plurality of pixel values based on the adjusted amplitude variable after each amplitude variable corresponding to the one or more functions is adjusted to optimize the cost function to thereby produce updated pixel values for the plurality of pixel values; and generating an output image represented by a second number array having a plurality of output image pixels formed by the updated pixel values for the plurality of pixel values with an enhanced image quality.

8. The method of claim 7, wherein the output image is generated when (1) each amplitude variable corresponding to the one or more functions has been adjusted to optimize the cost function, (2) an input from a user to stop the method through a user interface is received, or (3) a value of the cost function is below a predetermined value.

9. The method of claim 7, wherein the cost function is a summation of squared differences between the plurality of original pixel values of the first number array and corresponding pixel values of a third number array obtained by convolving a point spread function (PSF) with a fourth number array obtained by adding to each pixel value a product of the amplitude variable and the respective function of the one or more functions with respect to the designated index.

10. The method of claim 7, wherein each of the indexes designated to the plurality of pixels is determined based on a coordinate and respective different color values of the respective pixel in the first number array.

11. The method of claim 7, wherein each of the indexes designated to the plurality of pixels is determined based on a value of the respective pixel relative to other pixel values.

12. The method of claim 7, wherein the first image is obtained from the imaging apparatus that includes a telescope, a camera, a light sensor, a radio receiver, a magnetic resonance imaging (MRI) system, an X-ray imaging system, a computerized tomography (CT) system, a positron emission tomography (PET) system, a radar, a synthetic aperture array, or a light detection and ranging system (LIDAR).

13. The method of claim 7, wherein each function of the one or more functions is a mathematically orthonormal function.

14. The method of claim 7, wherein each function of the one or more functions is selected from a trigonometry function, a discrete Fourier transform, a Zernike function, a Walsh function, or a Hadamard transform.

15. A non-transitory computer readable storage medium comprising machine-readable instructions that upon execution by one or more processors, are configured to cause the one or more processors to perform a method comprising:

obtaining an original image from an imaging apparatus;

processing pixels in the original image to generate a first image having a plurality of first pixels with more pixels than the original image, the first image represented by a first number array;

designating an index to each of a plurality of pixels of the first number array based on one or more features of the pixel relative to other pixels of the first number array;

adjusting an amplitude variable for each of one or more functions to optimize a cost function associated with the amplitude variable, the respective function, a plurality of pixel values, and a plurality of designated indexes;

updating the plurality of pixel values based on the adjusted amplitude variable after each amplitude variable corresponding to the one or more functions is adjusted to optimize the cost function to thereby produce updated pixel values for the plurality of pixel values; and generating an output image represented by a second number array having a plurality of output image pixels formed by the updated pixel values for the plurality of pixel values with an enhanced image quality.

16. The non-transitory computer readable storage medium of claim 15, wherein the output image is generated when (1) each amplitude variable corresponding to the one or more functions has been adjusted to optimize the cost function, (2) an input from a user to stop the method through a user interface is received, or (3) a value of the cost function is below a predetermined value.

17. The non-transitory computer readable storage medium of claim 15, wherein the cost function is a summation of squared differences between the plurality of original pixel values of the first number array and corresponding pixel values of a third number array obtained by convolving a point spread function (PSF) with a fourth number array obtained by adding to each pixel value a product of the amplitude variable and the respective function of the one or more functions with respect to the designated index.

18. The non-transitory computer readable storage medium of claim 15, wherein the generating the first image based on the original image comprises performing oversampling on the original image.

19. The non-transitory computer readable storage medium of claim 15, wherein the imaging apparatus comprises a telescope, a camera, a light sensor, a radio receiver, a magnetic resonance imaging (MRI) system, an X-ray imaging system, a computerized tomography (CT) system, a positron emission tomography (PET) system, a radar, a synthetic aperture array, or a light detection and ranging system (LIDAR).

20. The non-transitory computer readable storage medium of claim 15, wherein each function of the one or more functions is mathematically orthonormal.

* * * * *